No. 785,794. PATENTED MAR. 28, 1905.
G. H. BUCKINGHAM.
HEN'S NEST.
APPLICATION FILED AUG. 3, 1904.
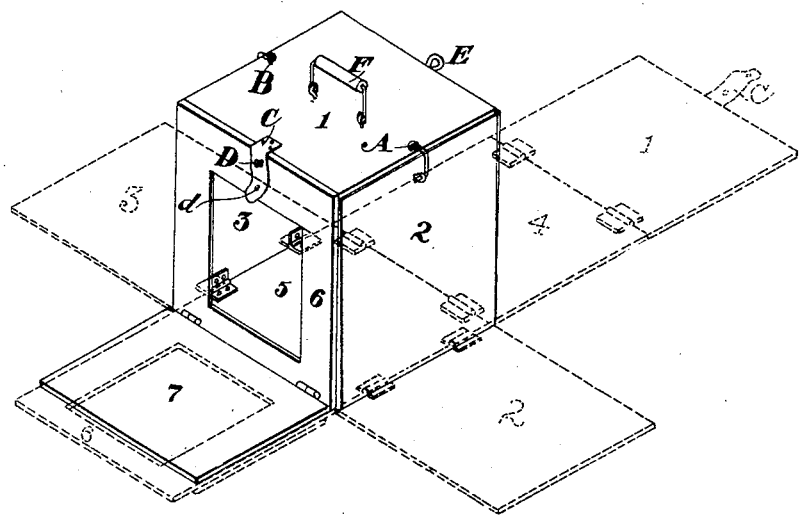
Witnesses
Inventor
George H. Buckingham
by Hazard & Harpham
Attorneys.

No. 785,794. Patented March 28, 1905.

UNITED STATES PATENT OFFICE.

GEORGE H. BUCKINGHAM, OF PICO HEIGHTS, CALIFORNIA.

HEN'S NEST.

SPECIFICATION forming part of Letters Patent No. 785,794, dated March 28, 1905.

Application filed August 3, 1904. Serial No. 219,368.

*To all whom it may concern:*

Be it known that I, GEORGE H. BUCKINGHAM, a citizen of the United States, residing on Pico Heights, close to the city of Los Angeles, in the county of Los Angeles and State of California, have invented new and useful Improvements in Hens' Nests, of which the following is a specification.

The object of my invention is to provide a hen's nest which can be transported from place to place and can be closed up, so that the hen cannot get out of the same while closed and will be protected therein when closed from the annoyance of other chickens and can be opened out into the position shown in dotted lines, so that the interior can be easily examined, cleaned, and whitewashed and readily refolded into its closed position. I accomplish this object by means of the device described herein and shown in the accompanying drawing, being a perspective view of my device folded together in position for use, the front door being in the open outwardly-projecting position.

The nest is composed of seven pieces hinged together, as shown in the drawing, as follows: 1 is the top, 2 and 3 are the sides, 4 is the rear end, (shown only in dotted lines,) 5 is the bottom, 6 is the front side, in which is the opening for the door, and 7 is the door. These parts are hinged together, as shown, whereby when folded into the position shown in full lines they compose the complete nest. When the two sides are put in the vertical position shown in full lines and the top 1 is brought up and placed on top thereof, as shown in full lines, and the hooks A and B carried on the top are hooked into eyelets on the side pieces 2 and 3 and the front piece 6 is thrown into position and the leather strap C is buttoned to the eye D on the front side of 6, the nest is then ready for use, the door 7 being in its open and projecting position and affords a rest upon which the hen can stand before she enters the nest.

The nest may be hung up on the side of the barn or any appropriate place by means of the eye on the back of same.

It will be manifest that this nest can be easily put into a position in which it can be easily cleaned and whitewashed and returned to its normal position, as shown in full lines in the drawing, after being cleaned and whitewashed. A handle F is carried by the top, by means of which the nest can be carried from place to place.

Having described my invention, what I claim as new, and desire to secure by Letters Patent, is—

A folding hen's nest comprising a base, sides hinged to each edge thereof, one side having an opening, a door hinged in place to close said opening or when open to constitute a platform in front of the opening, and a top removably connected with the upper edges of the sides and door.

In witness that I claim the foregoing I have hereunto subscribed my name this 28th day of July, 1904.

GEORGE H. BUCKINGHAM.

Witnesses:
 HENRY T. HAZARD,
 G. E. HARPHAM